March 30, 1926.
F. S. BARKS
1,578,949
CONNECTION FOR LUBRICATORS
Filed July 24, 1924
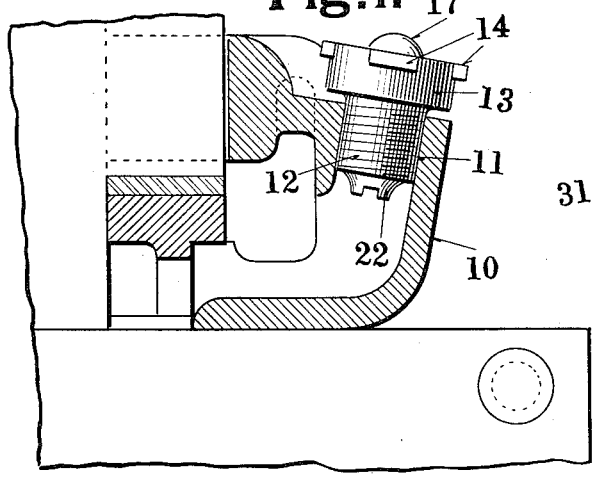
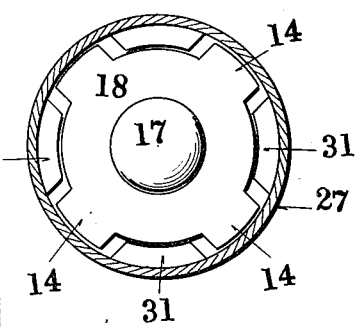
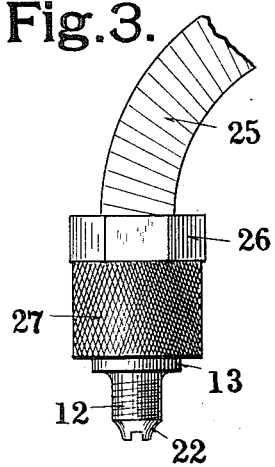
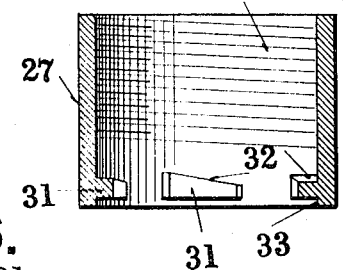
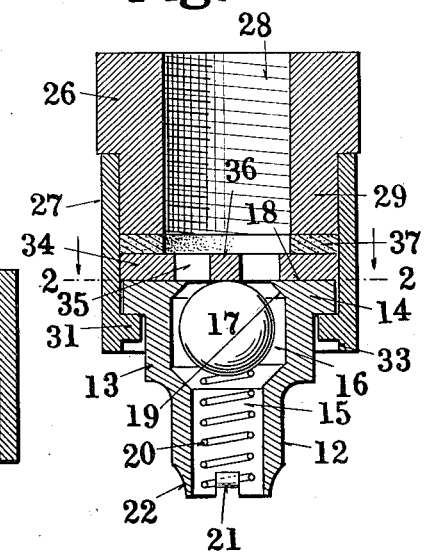
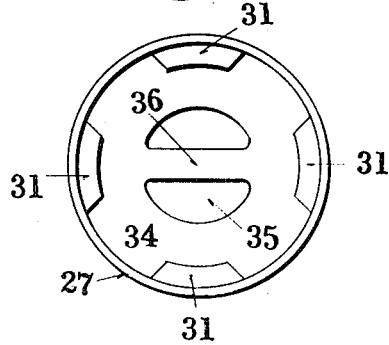
INVENTOR
FRANK S. BARKS
BY *E. E. Huffman*
ATTORNEY Patented Mar. 30, 1926.

1,578,949

UNITED STATES PATENT OFFICE.

FRANK S. BARKS, OF ST. LOUIS, MISSOURI.

CONNECTION FOR LUBRICATORS.

Application filed July 24, 1924. Serial No. 727,864.

*To all whom it may concern:*

Be it known that I, FRANK S. BARKS, a citizen of the United States of America, residing at the city of St. Louis, State of Missouri, United States of America, have invented a certain new and useful Connection for Lubricators, of which the following is such a full, clear, and exact description as will enable any one skilled in the art to which it appertains to make and use the same, reference being had to the accompanying drawings, forming part of this specification.

My invention relates to a connector for lubricators and is especially designed for use with lubricators in which a semi-liquid lubricant or grease is applied under pressure to the bearings of a vehicle or machine.

In the accompanying drawings which illustrate one form of a connector made in accordance with my invention, Figure 1 is a side view, partly in section, of a portion of a mine car axle box by which the fixed part of the connection is carried; Figure 2 is a section on the line 2—2 of Figure 5; Figure 3 is a side elevation showing the two parts of the connector coupled together but detached from the axle box; Figure 4 is an enlarged section of the coupler sleeve; Figure 5 is an enlarged vertical central section through both parts of the coupling; and Figure 6 is a bottom plan view of the movable part of the coupling.

As shown in Figure 1 of the drawings, the fixed part of the connector, which is composed of two separable parts, is applied to a mine car axle box indicated by the numeral 10. The box 10 is provided with a threaded opening 11 to receive the correspondingly threaded nipple 12 of the fixed part of the connection. Carried by and preferably formed integral with the nipple 12 is a cylindrical body portion 13 on which are coupling lugs 14 preferably four in number. This part of the connection comprising the nipple 12 and body 13 has formed therein a passage 15 (Figure 5) terminating at its upper end in an enlargement or chamber 16 containing a ball valve 17. The face 18 of the body 13 forms one of the contact surfaces of the connection and has its inner edge turned over at 19 to retain the ball 17 and to form a valve seat to cooperate with the ball and thus form a retaining valve for the grease in the axle box. Situated in the passage 15 and bearing against the ball is a helical spring 20 the lower end of which is held by clips 21 formed by turning over portions of the lower edge of the nipple which is reduced in thickness to facilitate this, as shown at 22.

Carried on the end of a flexible pipe 25 leading from any suitable source (not shown) for supplying the lubricant under pressure, is the movable part of the connection comprising a plug 26 and a connector sleeve 27. Passing centrally through the plug 26 is an opening 28 internally threaded for connection with the pipe 25 and the plug, which is preferably hexagonal, has a reduced cylindrical portion 29 threaded to engage with corresponding threads on the interior surface 30 of the sleeve. Formed on the surface 30 are lugs 31 having inclined upper faces 32 cooperating with the coupling lugs 14 on the portion 13. The lugs 31 are arranged at a slight distance from the end of the sleeve so as to provide a guiding flange 33 for facilitating the coupling of the two parts especially when the connector is situated in a limited space. Grease tight contact between the two parts of the connection is effected by the face 18 and an end piece 34 having a central opening 35 for the passage of the grease. Extending across the opening 35 is a base 36 adapted to contact with the ball 17, as shown in Figure 5, when the two parts of the connector are coupled, and open the valve, thus avoiding the resistance to the flow of grease which would occur if the opening of the valve depended upon the pressure of the grease itself. The end piece 34 may be formed integral with the plug 26 but I prefer to make it in the form of a separate disk as shown both for convenience in manufacture and also to provide means for easily renewing the contact surface, should it become worn, by substituting a new disk. When a separate end piece is used a packing ring 37 of rubber or soft metal is preferably used to provide a tight joint between the end piece and plug.

Having fully described my invention, what I claim as new and desire to secure by Letters Patent of the United States is:

1. In a device of the class described, a two part coupling, one part being provided with a valve and having external locking lugs, the other part comprising a sleeve having internal lugs and a plug threaded therein, a movable end piece for said plug within said sleeve and cooperating with said first named part, said end piece being retained in position by said lugs, and a packing between said end piece and plug.

2. In a device of the class described, the combination with a body portion, of a sleeve separably secured to said body portion and provided with inwardly projecting lugs, a disk member situated between said lugs and said body portion, and a nipple containing a valve, said nipple cooperating with said lugs to hold the parts together and with said disk member to form a tight joint.

3. In a device of the class described, the combination with a body portion, of a sleeve separably secured to said body portion and provided with inwardly projecting lugs, a disk member situated between said lugs and said body portion, said disk member having a central opening with a bar thereacross, a nipple containing a valve, said nipple cooperating with said lugs to hold the parts together and with said disk member to make a tight joint, said cross bar cooperating with the valve in the nipple to open the same, and a packing member arranged between said body portion and disk member.

In testimony whereof, I have hereunto set my hand this the 8th day of July, 1924.

FRANK S. BARKS.